H. TECHEL.
TELESCOPE DEVICE FOR DETERMINING THE ANGLE OF ALLOWANCE IN FRONT ON ATTACKING A MOVING TARGET.
APPLICATION FILED DEC. 8, 1920.

1,423,168.

Patented July 18, 1922.
2 SHEETS—SHEET 1.

Inventor
Hans Techel
By Knight Bros.
Attys

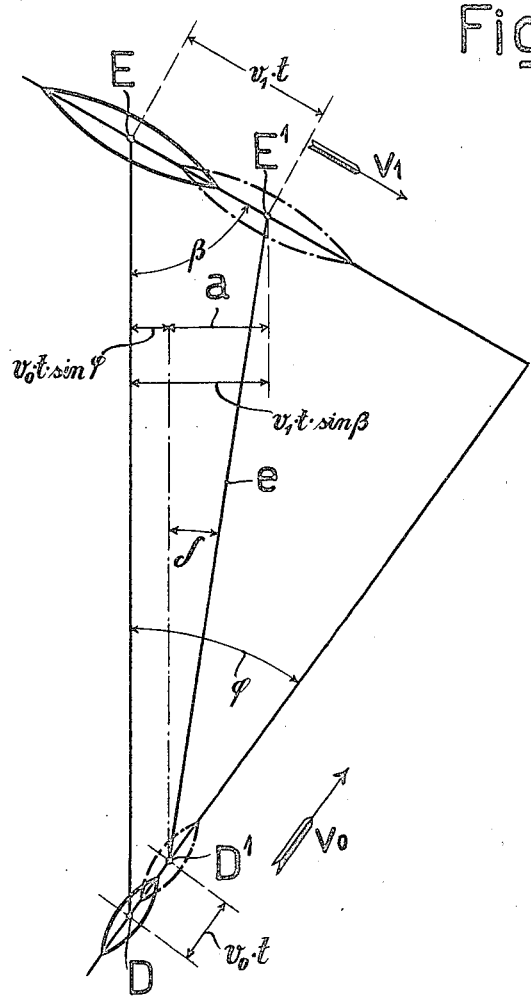
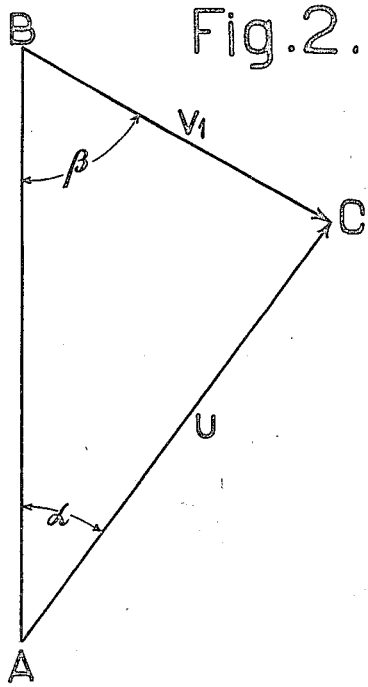

UNITED STATES PATENT OFFICE.

HANS TECHEL, OF KIEL, GERMANY, ASSIGNOR TO FRIED. KRUPP AKTIENGESELL-SCHAFT GERMANIAWERFT, OF KIEL-GAARDEN, GERMANY.

TELESCOPE DEVICE FOR DETERMINING THE ANGLE OF ALLOWANCE IN FRONT ON ATTACKING A MOVING TARGET.

1,423,168.      Specification of Letters Patent.      Patented July 18, 1922.

Application filed December 8, 1920. Serial No. 429,160.

*To all whom it may concern:*

Be it known that I, Dr. HANS TECHEL, residing at Kiel, Germany, a citizen of the German Republic, have invented a certain new and useful Improvement in a Telescope Device for Determining the Angle of Allowance in Front on Attacking a Moving Target, of which the following is a specification.

The present invention relates to a sighting device for obtaining the "corrected angle" when firing on a moving target, and its main feature resides in that its readings depend on quantities which are easily, clearly and accurately decided; and that the "corrected angle" can be determined by an observer, whether he is on a stationary or a moving ship, by the use of a simple computation from the reading on an angle scale.

In the accompanying drawing one embodiment of the invention is illustrated, showing a sighting device that is especially suitable for a vessel firing torpedoes against a moving ship.

Figs. 2 and 3 are simple diagrams of the occurring relative mathematical quantities.

Figure 1:
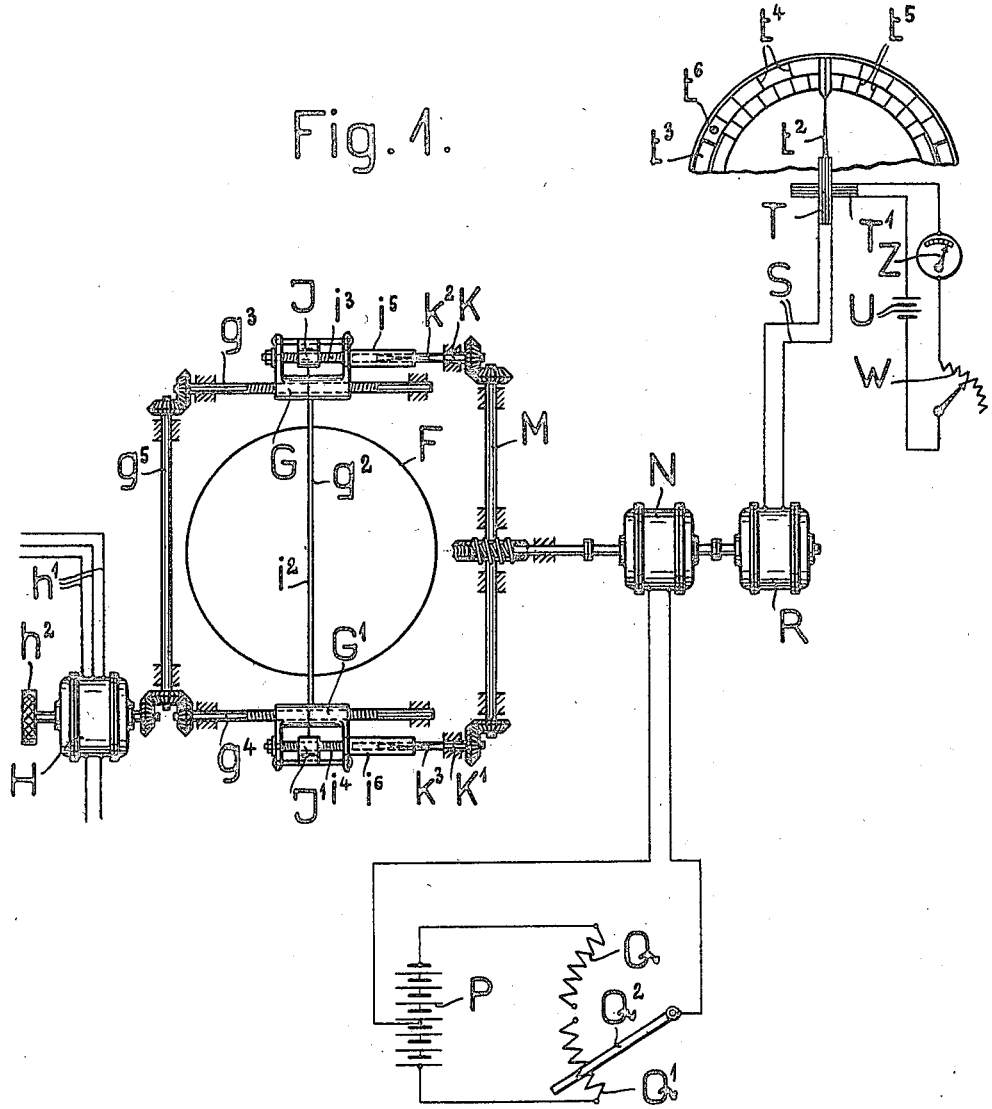
Fig. 1 shows diagrammatically an assembly of the device.

Referring first to Figs. 2 and 3, the relation between the quantities in question will now be described.

If an observer, positioned at point A Fig. 2 on a stationary vessel, desires to hit accurately a target, which, at the moment of sending a torpedo, is situated at point B and follows a course $\beta$ against the line BA and moves with a speed $v'$ towards the point C, then he must fire the torpedo, the mean velocity of which may be $u$, at a corrected angle $\alpha$, the magnitude of which is to be obtained from the triangle determined by $v'$, $u$ and $\beta$. From the sine formula we find $$\sin \alpha = \frac{v'}{u} \times \sin \beta.$$

As, however, both the course $\beta$ and the speed $v'$ of the target are quantities difficult to determine for the observer positioned at point A, the expression for sin $\alpha$ must be changed somewhat. At the same time it will be supposed that the observer is on a vessel moving at a speed $v°$ (see Fig. 3) and traveling during the time $t$ along the course $\varphi$ against the line DE (observer to target), a distance $v° \times t$, or, in other words, from D to D'. During the same time the target vessel travels the distance E to $E' = v' \times t$, that is, at a speed $v'$ on a course $\beta$. The distance, observer to target, at the end of the time $t$ is now D' to $E = e$.

If now the angle $\delta$ were measured, that is, the change during the time $t$ in the direction observer to target, then the angular change per second $w = \frac{\delta}{t}$ is also known. As, however, $\delta$ is a small angle, we may write $\delta = \frac{a}{e}$, where $a$ is the difference between the projection of lines E—E' and D—D' on a line perpendicular to the direction DE. By consulting Fig. 3, the following equation is now found:

$$\delta = \frac{v' \times t \times \sin \beta - v° \times t \times \sin \varphi}{e}$$

and consequently $$w = \frac{v' \sin \beta - v° \sin \varphi}{e}.$$

Lastly, using the expression derived from Fig. 2:

$$\sin \alpha = \frac{v'}{u} \sin \beta$$

we find:

$$\sin \alpha = \frac{e \times w}{u} + \frac{v°}{u} \times \sin \varphi,$$

which becomes $$\sin \alpha = \frac{e \times w}{u}$$

for $v° = o$, when the observer is stationary. Evidently the "corrected angle" $\alpha$ for stationary observer depends not only on the distance $e$ and the mean torpedo speed $u$, but also on the speed $w$, that is, the change of target direction in consequence of the movement of the target.

When the observer is positioned on a vessel traveling on a course $\varphi$ with a speed $v°$, the sine for the "corrected angle" $\alpha$ is derived by adding the expression $\frac{e \times w}{u}$ to the expression $\frac{v°}{u} \sin \varphi$ computed mentally or by slide rule, which last two expressions only receive magnitudes which are derived with great accuracy at the observer's place.

Referring now to the device diagrammatically illustrated in Fig. 1, the eye-piece of the observer's telescope is designated by reference letter F. In the plane of the image is situated an upright cross-hair $g^2$ secured in two slides G and G', and so arranged that it may be displaced parallel to itself in the plane of the image by simultaneous turning of two threaded spindles $g^3$, $g^4$, when the vessel carrying the telescope changes its course. This displacement of the cross-hair $g^2$ is made possible through the use of a receiver H connected by means of distance conductors $h'$ to a generator of, for instance, a circular compass (not shown) positively connected with spindles $g^3$, $g^4$, by means of gear wheels and intermediary shaft $g^5$. This arrangement serves the purpose of maintaining the initial target direction during change of the course of the vessel. A hand wheel $h^2$, secured on the revoluble part of the receiver H, serves to adjust the cross-hair $g^2$ on the target. On each of the threaded spindles $i^3$ and $i^4$ are other slides J and J' carried in the slides G and G', displaceable in a direction parallel to that of the displacement of the slides G and G'. Another cross-hair $i^2$ is stretched between the two slides J and J' parallel to the cross-hair $g^2$ in such a manner that it may pass by the latter. The threaded spindles $i^3$ and $i^4$ are provided with sleeves $i^5$ and $i^6$ reaching through the slides G and G'. These sleeves are constructed as couplings with square holes, in which the free ends $k^2$ and $k^3$, correspondingly shaped, of two shafts K and K' enter in such a manner that the spindles $i^3$ and $i^4$ are always coupled to the shafts K and K' in whatever position the slides G and G' pass. The shafts K and K' are each driven, through the intermediary of bevel gears, by a shaft M, which is positively connected with a direct current motor N through a worm gear. The armature current for the motor N is taken from a battery P, which is connected with the motor N over adjustable resistance coils Q, Q', and an operating lever $Q^2$ sliding on the latter, in such a manner that the motor may be run in either direction with regulated speed.

To the direct current motor N is coupled a current generator R, which is excited by permanent magnets, and its armature current received from a revoluble spool T through conductors S. The spool T is part of a measuring instrument constructed like a wattmeter, the stationary spool T' of which is inserted in the circuit of a battery U, to which also belong another adjustable resistance coil W and a current indicator Z. With the revoluble spool T is positively connected an index $t^2$, which plays over a reading dial having two scales $t^4$ and $t^5$. On scale $t^4$ are to be found the values of the desired "corrected angles" $\alpha$ reading to both sides of the zero in the middle, while the scale $t^5$ shows the values that the magnitude $\frac{v°}{u} \sin \varphi$ may obtain. The scale $t^4$ is displaceable in a circular guide on the housing $t^3$, by means of a handle $t^6$, while the other scale $t^5$ is applied directly on the housing $t^3$.

In the described device the current strength of the current generator R is proportionate to the speed of the motor N. This speed is, however, proportionate to the speed with which the cross-hair $i^2$ is displaced transversely to the optical axis of the telescope. If, therefore, the operating lever $Q^2$ is moved so that the motor N attains such a speed that the cross-hair $i^2$ continuously covers the target, then the revoluble spood T of the measuring instrument will be run through by a current, the strength of which is proportionate to the angular change $w$ per second. If now care is taken by setting the adjustable resistance coil W, that a constant current runs through the stationary spool T' of the measuring instrument, this current being proportionate to the expression $\frac{e}{u}$; then (on the stationary vessel) the displacement of the index $t^2$ constitutes a measurement for the sin $\alpha$, that is, for the sine of the desired "corrected angle."

It is then only necessary to regulate the scale $t^4$ by means of the handle $t^6$, so that its zero point, which is in the middle of the scale, coincides with the division line on scale $t^5$, corresponding to the expression $\frac{v°}{u} \sin \varphi$, and then the value of the "corrected angle" for a moving vessel may also be read directly, by means of the index $t^2$ on the scale $t^4$. The current strengths, derived from experiments and corresponding to the different values of the quotient $\frac{e}{u}$, readable on the current indicator Z, upon regulating the adjustable resistance coil W, are arranged in a table from which, at each time, the value of the current strength of the current flowing through the spool T' may be obtained; this value corresponding to the given value of the distance $e$ and the firing velocity $u$.

The use of the described device is as follows:

It will be supposed that the direction of firing the torpedo coincides with the direction of travel of the vessel carrying the sighting device, and that one of the two cross-hairs $g^2$ and $i^2$ covers the other. By means of a preliminary estimation of the target distance, the vessel, also upon a first estimation, is now directed on a course $\varphi$ (Fig. 3), which is approximately the same as the assumed "corrected angle" $\alpha$. Thereupon, the expression $$\frac{v^o}{u} \sin \varphi$$

is obtained by means of slide rule and the zero point of the scale $t^4$, showing the corrected angle, Fig. 1, is now set against the division line of the scale $t^5$, which corresponds to this expression. Now the target distance is to be measured accurately, the quotient $\frac{e}{u}$ found, and from the table for $\frac{e}{u}$ the corresponding value for the current strength, which may be read on the current indicator Z, is taken out. The resistance coil W is regulated so that the current indicator Z shows the indicated current strength. By turning the hand wheel $h^2$, the cross-hairs $g^2$ and $i^2$ are now made to cover the target and, by means of the operating lever $Q^2$, the motor N is given such a speed that the second cross-hair $i^2$ remains in position to continuously cover the target. The desired "corrected angle" $\alpha$ can now be read off the measuring instrument by means of the index $t^2$, and the scale $t^4$, and the course, if necessary, can be brought to coincide with the read corrected angle, and thereupon the shot fired.

If change in the course should take place during the described procedure, as a consequence of high seas or other causes, then the direction of the target decided by the cross-hair $g^2$ is held parallel to itself in the space, by means of the compass influencing the cross-hair $g^2$. The direction given by the cross-hair $i^2$ receives also such a displacement, that the target direction remains parallel to itself.

The device forming the object of the present invention does consequently distinguish itself thereby, that it permits a direct reading of the "corrected angle" $\alpha$ on an indicating dial, and indeed, both for stationary and for a moving observer, and independent of whether the vessel on which the observer is stationed changes or retains its course.

When in the claims the expression "cross-hair" is used, any of its usual equivalents, such as a straight, scribed line or an etched or cut groove on a diaphragm, is meant to be covered.

Claims.

1. In a sighting telescope used against a moving target, a cross-hair mounted to be displaced transversely to the telescope axis; a driving member positively connected with said cross-hair, an indicator for reading the "corrected angle", and means transmitting the speed of the driving member to the indicator.

2. In a sighting telescope used against a moving target, a cross-hair mounted to be displaced transversely to the telescope axis; a driving member positively connected with said cross-hair, an indicator for reading the "corrected angle", and means transmitting the speed of the driving member to the indicator; said indicator being electrically-controlled.

3. In a sighting telescope used against a moving target, a cross-hair mounted to be displaced transversely to the telescope axis; a driving member positively connected with said cross-hair, an indicator for reading the "corrected angle", and means transmitting the speed of the driving member to the indicator; said indicator being constructed in the manner of a wattmeter having a stationary and a revoluble spool; said means comprising a continuously excited current generator positively connected with said cross-hair, and a current source of constant tension; said revoluble spool having connection with said current generator; and said stationary spool being fed by said current source with current of adjustable strength.

4. In a sighting telescope used against a moving target, a cross-hair mounted to be displaced transversely to the telescope axis; a driving member positively connected with said cross-hair, an indicator for reading the "corrected angle", and means transmitting the speed of the driving member to the indicator; said indicator being constructed in the manner of a wattmeter having a stationary and a revoluble spool, said means comprising a continuously excited current generator positively connected with said cross-hair, and a current source of constant tension; said revoluble spool having connection with said current generator; and said stationary spool being fed by said current source with current of adjustable strength; said indicator being provided with a movable index and two concentric scales for said index.

5. In a sighting telescope used against a moving target, a cross-hair mounted to be displaced transversely to the telescope axis; a driving member positively connected with said cross-hair, an indicator for reading the "corrected angle", and means transmitting the speed of the driving member to the indicator; said indicator being constructed in the manner of a wattmeter having a stationary and a revoluble spool, said means comprising a continuously excited current generator positively connected with said cross-hair, and a current source of constant tension; said revoluble spool having connection with said current generator; and said stationary spool being fed by said current source with current of adjustable strength; said indicator being provided with a movable index and two concentric scales for said index; one of said scales showing the "corrected angle" being revoluble as regards the other, and the other of said scales showing values for adjustment in computation of change in position of the observer.

6. In a sighting telescope used against a moving target, a cross-hair mounted to be displaced transversely to the telescope axis; a driving member positively connected with said cross-hair, an indicator for reading the "corrected angle", and means transmitting the speed of the driving member to the indicator; a compass, a second cross-hair similarly displaceable and positively connected with a compass; a carrier for each of said cross-hairs, one of said carriers being slidable upon the other.

The foregoing specification signed at Kiel, Germany, this 18th day of June, 1920.

DR. HANS TECHEL.

In presence of—
MAX TÜLTMANN,
KARL DIETRICK.